(12) United States Patent
Noro

(10) Patent No.: US 9,998,624 B2
(45) Date of Patent: Jun. 12, 2018

(54) IMAGE READING APPARATUS AND IMAGE READING METHOD

(71) Applicant: CANON KABUSHIKI KAISHA, Tokyo (JP)

(72) Inventor: Toshitaka Noro, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 148 days.

(21) Appl. No.: 15/218,831

(22) Filed: Jul. 25, 2016

(65) Prior Publication Data

US 2017/0048410 A1    Feb. 16, 2017

(30) Foreign Application Priority Data

Aug. 10, 2015 (JP) ................... 2015-158460

(51) Int. Cl.

| G06F 15/00 | (2006.01) |
|---|---|
| H04N 1/203 | (2006.01) |
| H04N 1/00 | (2006.01) |
| H04N 1/40 | (2006.01) |

(52) U.S. Cl.
CPC ....... H04N 1/2032 (2013.01); H04N 1/00411 (2013.01); H04N 1/00604 (2013.01); H04N 1/00748 (2013.01); H04N 1/00795 (2013.01); H04N 1/40056 (2013.01); *H04N 2201/0081* (2013.01); *H04N 2201/0094* (2013.01)

(58) Field of Classification Search
CPC ............. H04N 1/2032; H04N 1/00411; H04N 1/00604; H04N 1/00748; H04N 1/00795; H04N 1/40056

USPC ......................................... 358/408
See application file for complete search history.

(56) References Cited

U.S. PATENT DOCUMENTS

| 2007/0285690 A1* | 12/2007 | Matsuda ............... H04N 1/401 358/1.9 |
|---|---|---|
| 2011/0141504 A1* | 6/2011 | Utsunomiya ...... H04N 1/00681 358/1.9 |
| 2012/0126477 A1* | 5/2012 | Shimakawa ........... B65H 31/36 271/232 |
| 2015/0281514 A1* | 10/2015 | Kita ................... H04N 1/00572 358/448 |

FOREIGN PATENT DOCUMENTS

| JP | 2004-056524 | 2/2004 |
|---|---|---|
| JP | 2010-093760 | 4/2010 |
| JP | 2010-118911 | 5/2010 |

* cited by examiner

*Primary Examiner* — Mark R Milia

(74) *Attorney, Agent, or Firm* — Fitzpatrick, Cella, Harper & Scinto

(57) ABSTRACT

An image reading apparatus includes a first scanner configured to read a first image from a front side of a document, a second scanner configured to read a second image from a back side of the document, and first and second offset storage parts configured to store a first offset amount for correcting an inclination of the first image and a second offset amount for correcting an inclination of the second image, respectively. The image reading apparatus is configured to generate, when the first scanner is replaced, a new first offset amount based on the second offset amount, a first inclination amount of the first scanner, and a second inclination amount of the second scanner. The image reading apparatus is configured to correct the first image based on the new first offset amount.

16 Claims, 10 Drawing Sheets

IMAGE READING APPARATUS AND IMAGE READING METHOD

BACKGROUND OF THE INVENTION

Field of the Invention

The present invention relates to an image reading apparatus, such as a scanner, which is configured to read an image (hereinafter referred to as "document image") of a document.

Description of the Related Art

An image reading apparatus is connected to an image forming apparatus, such as a copier or a multifunction apparatus, and is used to read a document image in copying or facsimile transmission. Moreover, the image reading apparatus may be connected to an information processing apparatus, such as a personal computer, and be used as a scanner. When reading a plurality of documents successively one by one, the image reading apparatus includes a document conveying device, such as an automatic document feeder (ADF). The image reading apparatus is configured to take in the documents successively with the document conveying device so that document images may be read efficiently.

The image reading apparatus including the document conveying device is configured to read the document images with a scanner while conveying the documents, which have been taken in one by one from the document conveying device. The scanner includes a light emitting part configured to irradiate a document with light, and a light receiving part configured to receive reflected light, which has been reflected by the document. The image reading apparatus is configured to read a document image based on the reflected light received by the light receiving part. The image reading apparatus may have the structure including two scanners so as to sandwich a conveying path of the document. When including the two scanners, the image reading apparatus may read images on two sides (front side and back side) of the document by conveying the document once.

The light emitting part of the scanner normally has the structure in which a plurality of light emitting elements are arranged linearly. The light receiving part has the structure in which a plurality of light receiving elements are arranged linearly. The scanner may read the document image line by line in order with a direction orthogonal to the conveying direction of the document being a main scanning direction. In such configuration, accuracy in installing the scanner in the image reading apparatus affects quality of the read document image. For example, an irradiated region irradiated by the light emitting elements and a reading line of the light receiving elements may be inclined with respect to the main scanning direction. In this specification, such an incident is referred to as an inclination of the scanner, and an inclination angle is referred to as an inclination amount. In this case, the scanner is configured to scan the document in accordance with the inclination of the reading line, and hence to read an inclined document image. As a result, geometric quality of the read document image may be reduced.

In Japanese Patent Application Laid-open No. 2004-56524, there is disclosed an image reading apparatus, in which a pattern arranged near a reference scale for document alignment is read by a scanner (optical device element), and in which a document image is shifted based on a result of the reading to correct skew. In Japanese Patent Application Laid-open No. 2010-93760, there is disclosed an image reading apparatus, in which an inclination of a scanner is detected based on a result of reading a reference pattern formed inside a housing. This image reading apparatus is configured to correct a document image, which has been read by the scanner, depending on the inclination of the scanner. As described above, in the image reading apparatus in each of Japanese Patent Application Laid-open Nos. 2004-56524 and 2010-93760, an inclination amount of the scanner is detected based on the reference pattern, and an inclination of the document image is corrected depending on a result of the detection. In Japanese Patent Application Laid-open No. 2010-118911, there is disclosed an image reading apparatus, in which a skew amount of a conveyed document is detected, and in which a read document image is corrected depending on the detected skew amount of the document.

With the image reading apparatus in each of Japanese Patent Application Laid-open Nos. 2004-56524 and 2010-93760, the inclination amount of the scanner is detected based on the reference pattern, but when the reference pattern itself is inclined, an accurate inclination amount of the scanner cannot be detected. In addition, there is a need to drive the scanner in order to read the reference pattern, and accuracy of a reading operation of the scanner also affects accurate detection of the inclination amount of the scanner. With the image reading apparatus in Japanese Patent Application Laid-open No. 2010-118911, the skew amount of the conveyed document may be detected, but the inclination amount of the scanner is not taken into consideration. To address the above-mentioned problems, there is a demand for a technology of reliably detecting the inclination amount of the scanner. The present invention provides an image reading apparatus, which is configured to detect an inclination amount of a scanner more accurately than in the related art, and to read a high-quality document image.

SUMMARY OF THE INVENTION

An image reading apparatus according to the present invention comprises: a conveying part configured to convey a document placed on a document tray; a first scanner configured to read a first image on a first surface of the conveyed document, a scanning direction of the first scanner being a first scanning direction; a second scanner configured to read a second image on a second surface of the conveyed document, a scanning direction of the second scanner being a second scanning direction; a storage part configured to store a first correction condition corresponding to an inclination of the first scanning direction with respect to a direction orthogonal to a conveying direction in which the document is conveyed, and a second correction condition corresponding to an inclination of the second scanning direction with respect to the direction orthogonal to the conveying direction; a correction part configured to correct the first image based on the first correction condition, and to correct the second image based on the second correction condition; a detection part configured to detect a first inclination amount of the first image with respect to the direction orthogonal to the conveying direction, in which the document is conveyed, based on first image data of the first image output from the first scanner, and to detect a second inclination amount of the second image with respect to the direction orthogonal to the conveying direction, in which the document is conveyed, based on second image data of the second image output from the second scanner; and an update part configured to update, when the first scanner has been replaced, the first correction condition based on the second correction condition, the first inclination amount, and the second inclination amount, and to update, when the second scanner has been replaced, the second correction condition based on the first correction condition, the first inclination amount, and the second inclination amount.

Further features of the present invention will become apparent from the following description of exemplary embodiments (with reference to the attached drawings).

DESCRIPTION OF THE EMBODIMENTS

Now, embodiments of the present invention are described in detail with reference to the drawings.

Figure 1:
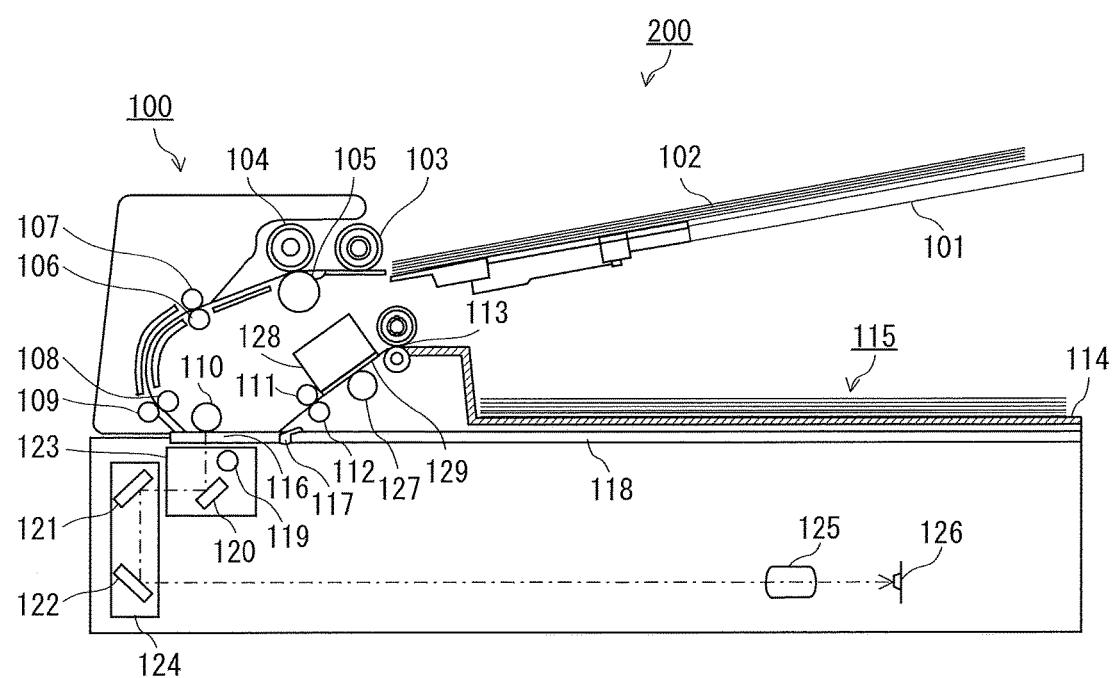
FIG. 1 is a structural view of an image reading apparatus.

FIG. 1 is a structural view of an image reading apparatus according to a first embodiment of the present invention. An image reading apparatus 200 includes a document conveying part 100, and an image reading part 115 configured to read a document image. The image reading apparatus 200 includes two scanners, and is capable of optically reading document images from both sides (front side and back side) of a document conveyed to a reading position by the document conveying part 100. A first scanner configured to read a document image on the front side is provided in the image reading part 115, and a second scanner configured to read a document image on the back side is provided in the document conveying part 100. The image reading apparatus 200 includes a control unit (not shown), which is configured to control operations of respective parts accompanying image reading processing, and to perform image processing on a read document image, to thereby generate image data.

<Structure of Document Conveying Part>

The document conveying part 100 includes a document tray 101, on which a bunch of documents formed of one or more documents 102 are placed. In this specification, the top surface and the undersurface of the document 102 placed on the document tray 101 are referred to as the "front side" and the "back side", respectively. The document conveying part 100 is configured to convey documents 102 one by one from the bunch of documents placed on the document tray 101 to a first reading position of the first scanner. The first reading position is a position sandwiched by a platen roller 110 and an original flow reading glass 116. For conveyance of the document 102 to the first reading position, there are provided, in order from the upstream side on a conveying path, a feeding roller 103, a separation roller 104, a separation driven roller 105, a registration roller 106, a registration driven roller 107, a read roller 108, and a read driven roller 109. A second reading position of the second scanner is provided on the downstream side of the first reading position in the conveying direction. The second reading position is a position sandwiched by a platen roller 127 and an original flow reading glass 129. From the first reading position to the second reading position, there are provided, in order from the upstream side on the conveying path, a jump stand 117, a read discharge roller 111, and a read discharge driven roller 112. On the downstream side of the second reading position on the conveying path, there is provided a delivery roller 113.

The feeding roller 103 is provided on the proximal end side of the document tray 101. The feeding roller 103 is pivotally supported by an arm (not shown), and is configured to move up and down with swings of the arm. When the documents 102 are placed on the document tray 101, the feeding roller 103 is configured to be retracted upward to a home position so as not to interfere with the placement operation. At the time of feeding, the feeding roller 103 is configured to be dropped and rotate on the document 102 at the top of the bunch of documents placed on the document tray 101. In this manner, the conveyance of the document 102 at the top of the bunch of documents is started.

The separation roller 104 and the separation driven roller 105 are provided at opposed positions to sandwich the conveying path of the document 102. The separation driven roller 105 is urged toward the separation roller 104. The separation driven roller 105 is made of a material having slightly smaller friction than that of the separation roller 104. The separation roller 104 and the separation driven roller 105 are configured to separate and convey the documents 102, which have been fed by the feeding roller 103, one by one.

The feeding roller 103 and the separation roller 104 are driven to rotate by the same drive source, and are configured to together convey the documents 102 one by one to the registration roller 106 and the registration driven roller 107. The separation driven roller 105 is configured to rotate with the rotation of the separation roller 104.

The document 102 is abutted at a side (leading end) at the top in the conveying direction against a nip portion, which is formed by the registration roller 106 and the registration driven roller 107, by the separation roller 104 and the separation driven roller 105. At this time, the registration roller 106 and the registration driven roller 107 are stopped. The document 102 forms a loop to align the same at the leading end to be parallel to a direction orthogonal to the conveying direction. Thereafter, the registration roller 106 and the registration driven roller 107 are started rotating to convey the document 102 to the read roller 108 and the read driven roller 109. The read roller 108 and the read driven roller 109 are configured to convey the document 102 to the first reading position. A document image on the front side, which is one side, of the document 102 is optically read by the first scanner at the first reading position while the document 102 is conveyed between the platen roller 110 and the original flow reading glass 116.

The read discharge roller 111 and the read discharge driven roller 112 are configured to convey the document 102, which has passed through the first reading position, to the second reading position. At this time, the document 102 is picked up from the original flow reading glass 116 by the jump stand 117. A document image on the back side, which is the other side, of the document 102 is optically read by the second scanner 128 at the second reading position while the document 102 is conveyed between the original flow reading glass 129 and the platen roller 127. The delivery roller 113 is configured to discharge the document 102, which has passed through the second reading position, to a delivery tray 114.

<Structure of Image Reading Part>

The image reading part 115 includes the first scanner and a platen glass 118. The image reading part 115 is capable of reading, by the first scanner, a document image on a document placed on the platen glass 118 in addition to the document image on the front side of the document 102, which has been conveyed to the first reading position by the document conveying part 100.

The first scanner includes a first mirror mount 123, a second mirror mount 124, a lens 125, and an image sensor 126, which is a light receiving part. The first mirror mount 123 includes a light emitting part 119, which is a light source, and a mirror 120. The second mirror mount 124 includes mirrors 121 and 122. In the first scanner, the light emitting part 119 is configured to irradiate the front side of the document 102. Radiated light is reflected by the document 102. The reflected light is guided to the lens 125 through the mirrors 120, 121, and 122, and the lens 125 is configured to form an image on the image sensor 126 with the reflected light. The image sensor 126 is configured to convert the received reflected light into electrical signals for output. These electrical signals form a document image on the front side.

The light emitting part 119 has the structure in which a plurality of light emitting elements are arranged linearly. As the light emitting element, a light emitting diode (LED) may be used, for example. The image sensor 126 has the structure in which a plurality of light receiving elements are arranged linearly in parallel to the plurality of light emitting elements. Therefore, the first scanner is configured to read the document image line by line with the depth direction of FIG. 1, that is, the direction orthogonal to the conveying direction of the document, being a main scanning direction.

The first mirror mount 123 and the second mirror mount 124 have an integral structure. When a document image on a document placed on the platen glass 118 is to be read, the document image is read line by line while the first mirror mount 123 and the second mirror mount 124 are moved at a constant speed in the left to right direction of FIG. 1. When a document image is to be read using the document conveying part 100, the first scanner reads the document image line by line from the document 102 conveyed through the first reading position.

Similarly to the first scanner, the second scanner 128 has the structure including a light emitting part and an image sensor. In the second scanner 128, the light emitting part is configured to irradiate the document 102, which is conveyed through the second reading position, with light, and the image sensor is configured to receive the light reflected by the document 102. The image sensor is configured to convert the received reflected light into electrical signals for output. These electrical signals form a document image on the back side. Similarly to the light emitting part 119 of the first scanner, the light emitting part of the second scanner 128 also has the structure in which a plurality of light emitting elements are arranged linearly. Similarly to the image sensor 126 of the first scanner, the image sensor of the second scanner 128 also has the structure of linear arrangement in parallel to the plurality of light emitting elements. Similarly to the first scanner, the second scanner 128 is configured to read the document image line by line with the depth direction of FIG. 1 being a main scanning direction.

The document conveying part 100 may have the structure excluding the registration roller 106 and the registration driven roller 107. In this case, the document 102 is read without the leading end being aligned.

Figure 2:
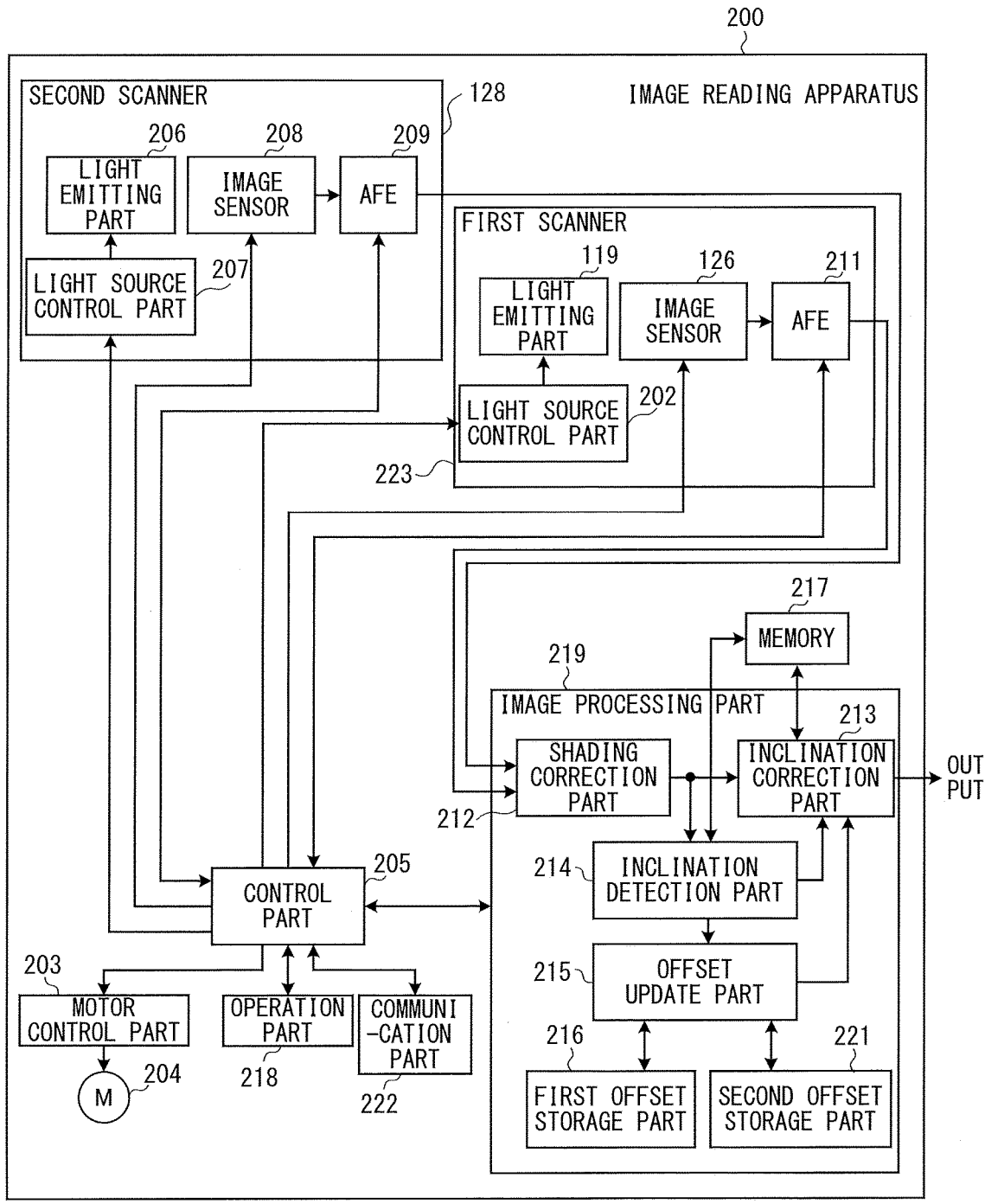
FIG. 2 is a configuration diagram of a control unit.

FIG. 2 is a configuration diagram of the control unit. The control unit includes a control part 205, a motor control part 203, a communication part 222, and an image processing part 219. To the control part 205, a first scanner 223, the second scanner 128, the image processing part 219, the motor control part 203, an operation part 218, and the communication part 222 are connected. Each of the control part 205 and the image processing part 219 includes a central processing unit (CPU), a read only memory (ROM), and a random access memory (RAN), for example. The CPU is configured to read a computer program stored in the ROM, and to execute the computer program using the RAM as a work area so that the control part 205 and the image processing part 219 transmit/receive signals to/from components to control operation of the image reading apparatus 200.

The motor control part 203 is configured to drive and control a motor 204, which is configured to move the first mirror mount 123 and the second mirror mount 124 of the first scanner 223 in response to control signals received from the control part 205.

The communication part 222 is an interface configured to control communication with an external information processing apparatus, such as a personal computer, via a network. The control part 205 may communicate with the external information processing apparatus via the communication part 222.

The operation part 218 is a user interface, and includes a display, which is an output part, and operation buttons and a touch panel, which are input parts. A user may operate the operation part 218 to give an instruction to read an image, or to make various settings. The operation part 218 is configured to display a message on the display for notification to the user and the like.

The first scanner 223 includes alight source control part 202, which is configured to control light emission of the light emitting part 119, and an analog front end (AFE) 211, which is configured to perform processing on the electrical signals generated by the image sensor 126. The light source control part 202 is configured to control timings at which the light emitting part 119 emits light in response to control signals received from the control part 205. The AFE 211 is configured to perform sample-and-hold processing, offset processing, gain processing, and other such analog processing on the electrical signals output from the image sensor 126, and to convert the electrical signals into digital signals, to thereby generate image data. The first scanner 223 is configured to transmit the image data to the image processing part 219. The second scanner 128 has a configuration similar to that of the first scanner 223, and includes a light source control part 207, which is configured to control light emission of the light emitting part 206, and an AFE 209, which is configured to perform processing on the electrical signals generated by the image sensor 208. The second scanner 128 is configured to transmit image data, which is generated in processing similar to that in the first scanner 223, to the image processing part 219.

When a document image is read from one side (front side) of the document 102, the control part 205 is configured to control operation of the first scanner 223, and not to control operation of the second scanner 128. When document images are read from both sides of the document 102, the control part 205 is configured to control the operation of the first scanner 223 and the second scanner 128. The first reading position of the first scanner 223 is located upstream of the second reading position of the second scanner 128 in the conveying direction of the document 102. Therefore, when the document images are read from the both sides of the document 102, the control part 205 is configured to control reading operation of the first scanner 223 first, and to control reading operation of the second scanner 128 with a delay in accordance with a timing at which the document 102 is conveyed.

Figure 3:
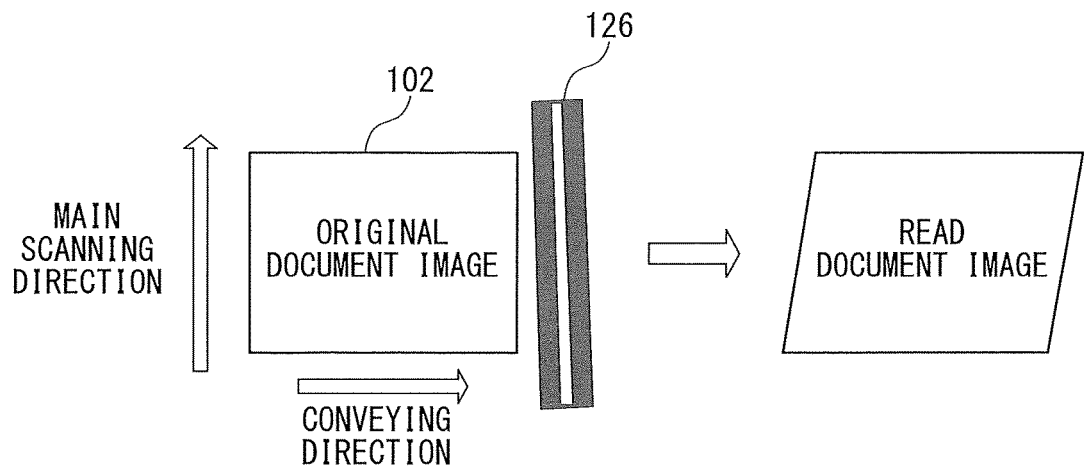
FIG. 3 is an explanatory diagram of a read image.

The image processing part 219 includes a shading correction part 212, an inclination correction part 213, an inclination detection part 214, an offset update part 215, a first offset storage part 216, and a second offset storage part 221. To the image processing part 219, a memory 217 is connected. The image processing part 219 is configured to correct the image data so as to prevent a reduction in geometric quality of the document image, which occurs when arrays of the light emitting elements and the light receiving elements are inclined with respect to the main scanning direction in the first scanner 223 and the second scanner 128. FIG. 3 is an explanatory diagram of a read image obtained when a document image is read in a state in which the image sensor 126 of the first scanner 223 is inclined with respect to the main scanning direction.

When the array of the light receiving elements of the image sensor 126 is inclined with respect to the main scanning direction, the image sensor 126 reads the document 102 obliquely. The image sensor 126 reads the original document image with an inclination in accordance with an inclination angle with respect to the main scanning direction. Here, sides orthogonal to the main scanning direction of the document image are not inclined. As a result, the read document image becomes a parallelogram that is inclined from the original document image in the conveying direction. The image processing part 219 is configured to correct the inclination of the read document image.

The shading correction part 212 is configured to perform shading processing on the image data acquired from the first scanner 223 and the second scanner 128. The shading correction part 212 is configured to correct, by the shading processing, a degradation in quality of the image data due to unevenness in light amount distribution when the light emitting parts 119 and 206 irradiate the document 102 and uneven sensitivity of the image sensors 126 and 208.

Figure 4:
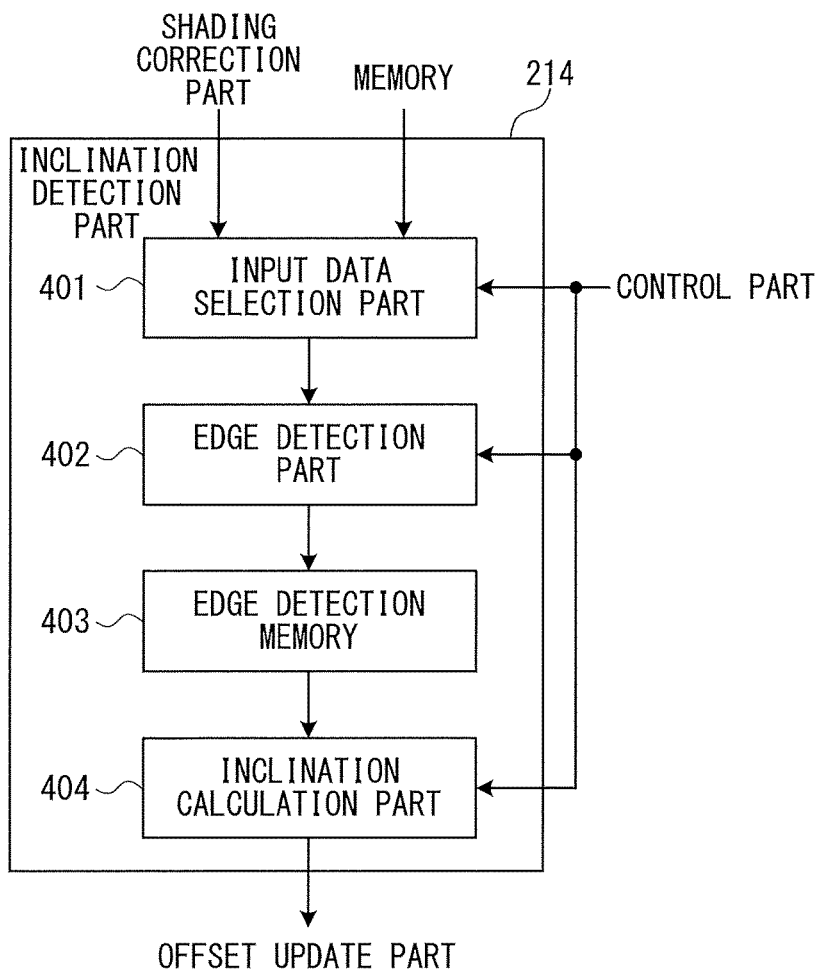
FIG. 4 is a configuration diagram of an inclination detection part.

The inclination detection part 214 is configured to detect a leading edge, which is the top of the document 102 in the conveying direction, from the image data, and to calculate an inclination amount (inclination angle) of the document 102 with respect to the main scanning direction based on the detected leading edge. FIG. 4 is a configuration diagram of the inclination detection part 214. The inclination detection part 214 includes an input data selection part 401, an edge detection part 402, an edge detection memory 403, and an inclination calculation part 404.

The input data selection part 401 is configured to input one of the image data corrected by the shading correction part 212 or image data stored in the memory 217 to the edge detection part 402 in response to an instruction from the control part 205.

The edge detection part 402 is configured to detect the leading edge of the document 102 based on the image data input from the input data selection part 401. The edge detection part 402 may have a detection range for the edge specified by the control part 205. A result of detecting the leading edge is held in the edge detection memory 403. The edge detection memory 403 is configured to hold a result of detecting the leading edge based on the image data generated by the first scanner 223, and a result of detecting the leading edge based on the image data generated by the second scanner 128. When reference image data is used, the edge detection memory 403 is configured to hold a result of detecting the leading edge based on reference image data of the first scanner 223, and a result of detecting the leading edge based on reference image data of the second scanner 128.

The image data usually contains a document image of the document 102 and an image of the background. The edge detection part 402 is configured to detect the leading edge based on a color boundary between the image of the document 102 and the image of the background, and on a shadow generated at the leading end of the document 102. The leading edge is detected by a known differential filter (Sobel filter or Laplacian filter), for example.

The inclination calculation part 404 is configured to calculate an approximate straight line indicating a line of the leading edge from positional information of the leading edge at each of a plurality of scanning positions of the document 102, which have been detected by the edge detection part 402. The inclination calculation part 404 is configured to calculate the inclination amount of the document 102 from the approximate straight line. The approximate straight line is calculated by a known least squares method or Hough transform.

Figure 5:
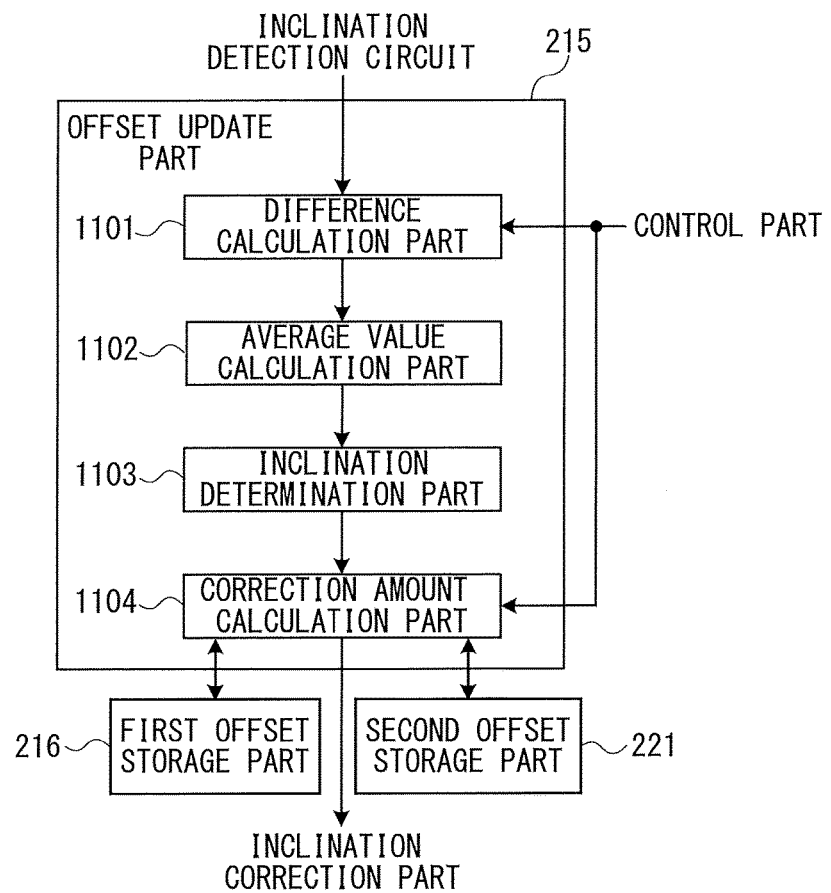
FIG. 5 is a configuration diagram of an offset update part.

The offset update part 215 is configured to calculate an offset amount, which is a correction condition of image data for correcting the document image depending on the inclination amount of the leading edge of the document 102 detected by the inclination detection part 214. FIG. 5 is a configuration diagram of the offset update part 215. The offset update part 215 includes a difference calculation part 1101, an average value calculation part 1102, an inclination determination part 1103, and a correction amount calculation part 1104.

The difference calculation part 1101 is configured to calculate a difference value DE between an inclination amount F_SKEW, which is detected from the image data generated by the first scanner 223, and an inclination amount R_SKEW, which is detected from the image data generated by the second scanner 128. The difference calculation part 1101 is configured to determine an inclination amount as a reference in response to an instruction from the control part 205. For example, when the control part 205 inputs an instruction to use the inclination amount from the image data of the first scanner 223 as the reference, the difference calculation part 1101 calculates the difference value DE with the expression: (F_SKEW−R_SKEW). When the control part 205 inputs an instruction to use the inclination amount from the image data of the second scanner 128 as the reference, the difference calculation part 1101 calculates the difference value DE with the expression: (R_SKEW−F_SKEW). When the first scanner 223 has been installed or replaced, the control part 205 inputs, to the difference calculation part 1101, the instruction to use the inclination amount from the image data of the second scanner 128 as the reference. When the second scanner 128 has been installed or replaced, the control part 205 inputs, to the difference calculation part 1101, the instruction to use the inclination amount from the image data of the first scanner 223 as the reference.

The average value calculation part 1102 is configured to calculate an average value of the difference values DE calculated by the difference calculation part 1101. The first scanner 223 and the second scanner 128 are configured to read document images of a plurality of documents 102. The average value calculation part 1102 is configured to calculate an average value of the difference values DE generated by reading the plurality of documents 102.

The inclination determination part 1103 is configured to determine an inclination direction of at least one of the first scanner 223 or the second scanner 128 depending on the average value of the difference values DE, which has been calculated by the average value calculation part 1102. An inclination amount detected by the inclination detection part 214 is expressed with the main scanning direction being "0", for example. Therefore, the inclination amount is expressed as a positive or negative value. The inclination determination part 1103 is configured to determine whether the average value of the difference values DE is positive or negative, to thereby determine the inclination direction.

The correction amount calculation part 1104 is configured to calculate an offset amount in accordance with the average value calculated by the average value calculation part 1102, a result of determination by the inclination determination part 1103, and reference offset amounts stored in the first offset storage part 216 and the second offset storage part 221. The first offset storage part 216 is configured to store a reference offset amount (first offset amount), which is an offset amount of the first scanner 223. The second offset storage part 221 is configured to store a reference offset amount (second offset amount), which is an offset amount of the second scanner 128. The correction amount calculation part 1104 is configured to input the calculated offset amount to the inclination correction part 213. The correction amount calculation part 1104 is configured to select the first offset amount or the second offset amount in response to an instruction from the control part 205. When the first scanner 223 has been installed or replaced, the control part 205 inputs, to the correction amount calculation part 1104, an instruction to select the second offset amount. When the second scanner 128 has been installed or replaced, the control part 205 inputs, to the correction amount calculation part 1104, an instruction to select the first offset amount.

The inclination correction part 213 is configured to correct the image data by affine transformation based on the inclination amount detected by the inclination detection part 214 and the offset amount calculated by the offset update part 215. As a result, the inclination of the image data with respect to the main scanning direction is corrected.

The inclination correction part 213 is configured to calculate positions of pixels for correcting an angle θ (inclination amount) of the document 102 with respect to the main scanning direction by the affine transformation. The positions of the pixels for correction are expressed with the main scanning direction being X and a sub-scanning direction being Y. The affine transformation is performed with the following expression.

$$X = x \cos \theta - y \sin \theta + x0$$

$$Y = x \sin \theta + y \cos \theta + y0$$

X: a pixel position after the correction in the main scanning direction
Y: a pixel position after the correction in the sub-scanning direction
x: a pixel position before the correction in the main scanning direction
y: a pixel position before the correction in the sub-scanning direction
x0: a translation amount in the main scanning direction
y0: a translation amount in the sub-scanning direction
θ: an angle based on the inclination amount calculated from the leading edge of the document The inclination correction part 213 is configured to correct data corresponding to the positions of the pixels, which have been calculated by the affine transformation from the image data acquired from the shading correction part 212. As a result, the inclination of the read image is corrected. In the above expression, x0 and y0 represent movement amounts for translating the image data that has been corrected in terms of inclination. Those movement amounts allow output positions of a leading portion and end portions of the document image to be aligned.

Figure 6:
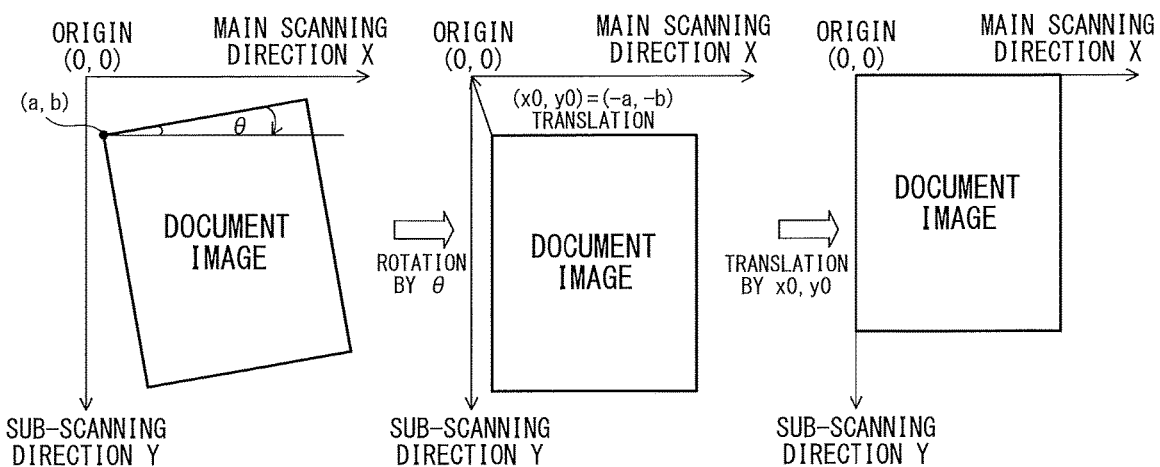
FIG. 6 is an explanatory diagram of correction of a document image.

FIG. 6 is an explanatory diagram of correction of a document image by the affine transformation. The leading edge of the document image read from the document 102 is inclined by the angle θ with respect to the main scanning direction (left). When the image data is corrected depending on the inclination amount, the leading edge becomes parallel to the main scanning direction (middle). After translation, a vertex of the leading edge of the document image matches with the origin.

Figure 7:
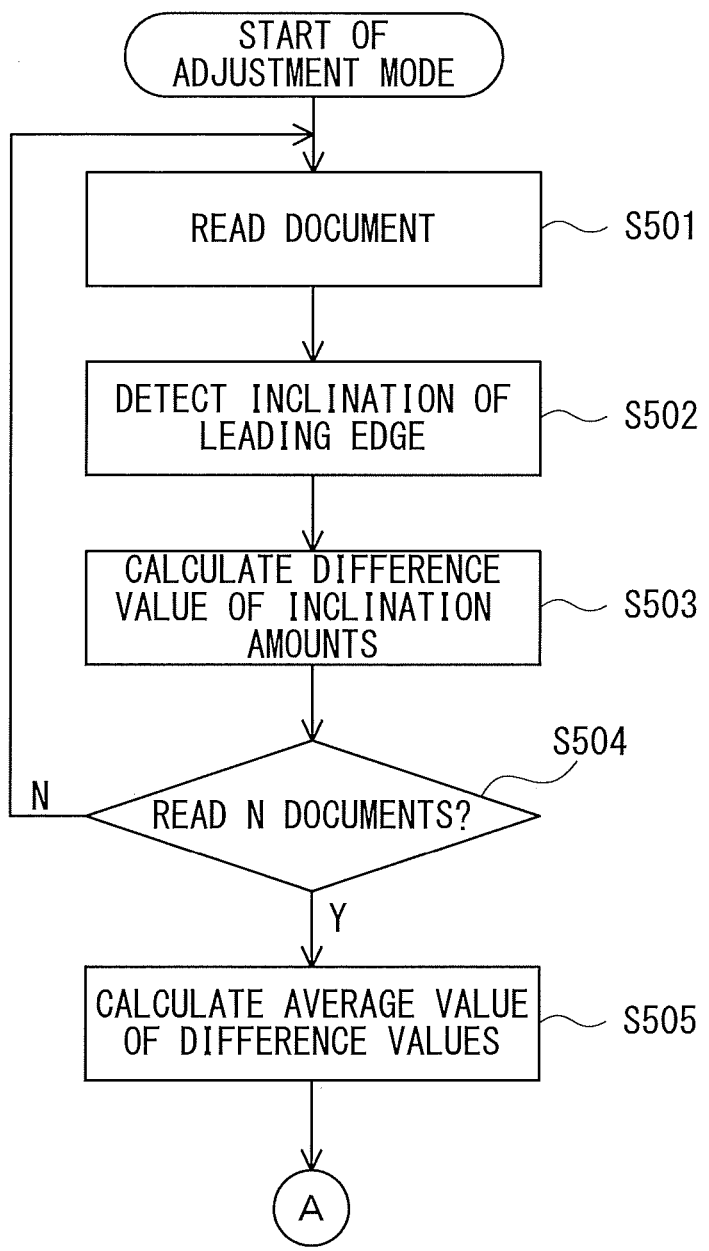
FIG. 7 is a flow chart for illustrating processing of calculating an offset amount.
Figure 8:
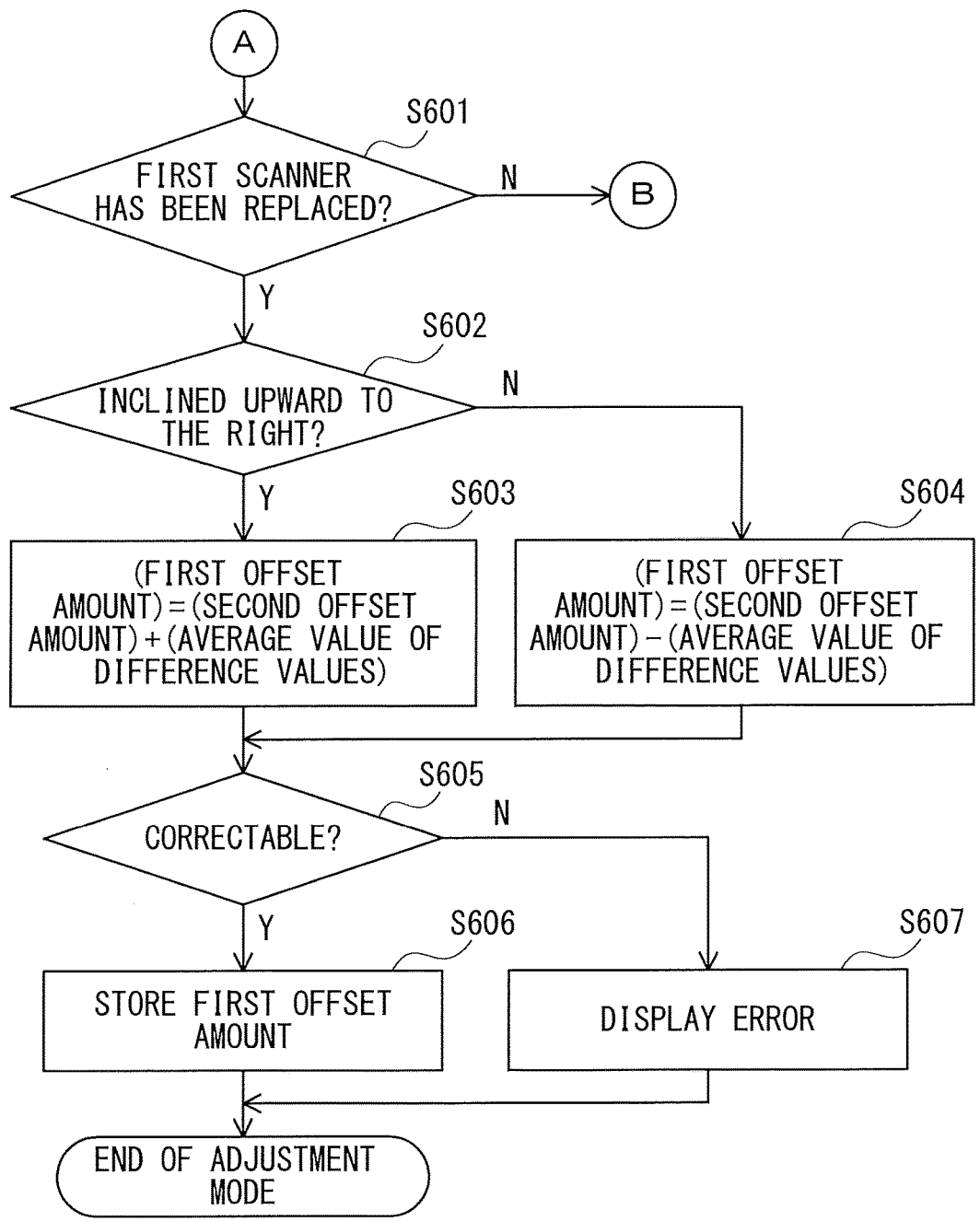
FIG. 8 is a flow chart for illustrating processing of calculating an offset amount.
Figure 9:
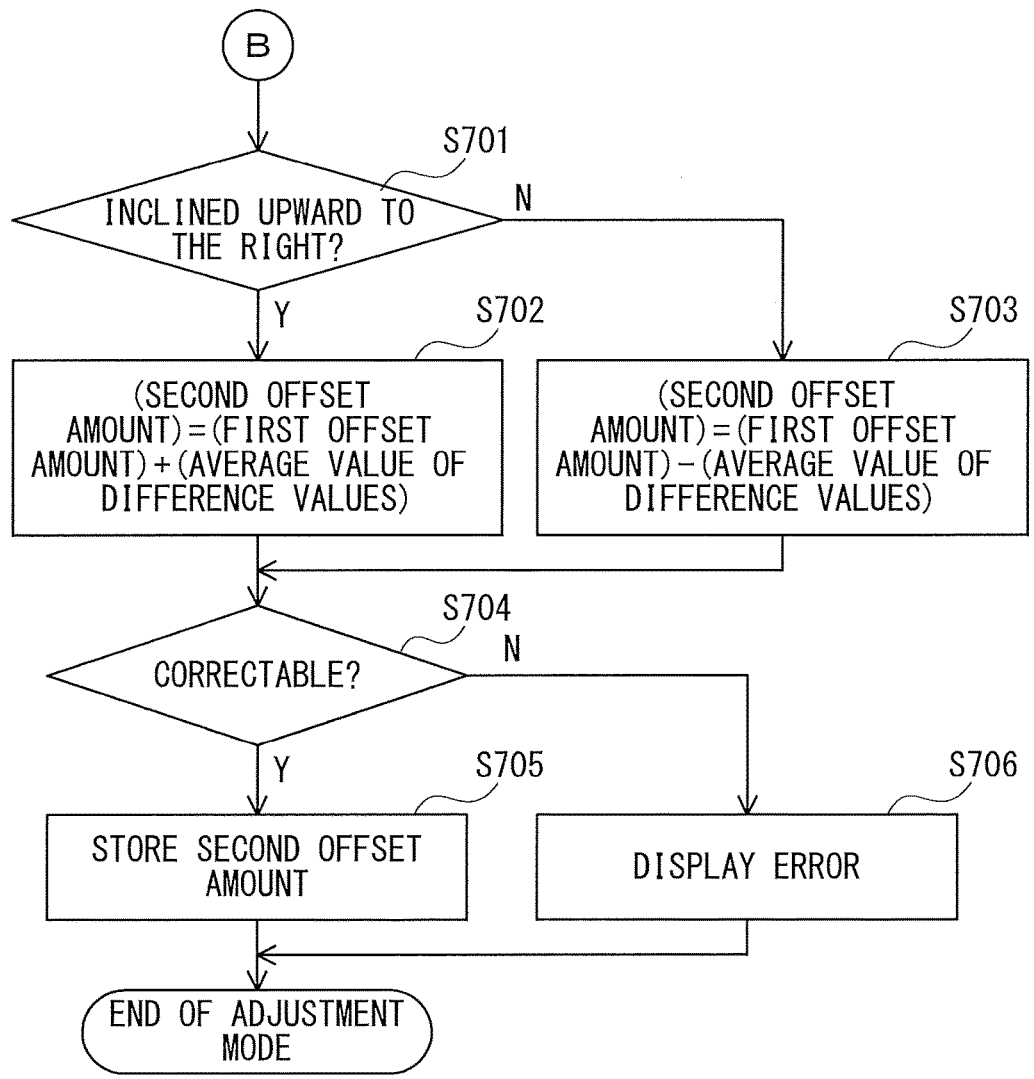
FIG. 9 is a flow chart for illustrating processing of calculating an offset amount.

The image reading apparatus 200 having the above-mentioned configuration is configured to, when the installation of the first scanner 223 and the second scanner 128 is inclined with respect to the main scanning direction, perform processing illustrated in FIG. 7 to FIG. 9, to thereby correct the document image. FIG. 7, FIG. 8, and FIG. 9 are flow charts for illustrating processing of calculating an offset amount for adjusting the inclination of the read image. This processing is performed when any one of the first scanner 223 and the second scanner 128 is installed or replaced.

When any one of the first scanner 223 and the second scanner 128 is installed or replaced, an operation mode of the image reading apparatus 200 is set to an adjustment mode for adjusting the first scanner 223 and the second scanner 128 via the operation part 218. After the operation mode is set to the adjustment mode, which of the first scanner 223 and the second scanner 128 is to be installed or replaced is selected via the operation part 218. A result of the selection is input from the operation part 218 to the control part 205.

When the above-mentioned input is made from the operation part 218, the image reading apparatus 200 starts reading the document 102 (Step S501). On the document tray 101, N (N is a natural number) documents 102 are placed. The image reading apparatus 200 reads document images on the both sides of the document 102 with the first scanner 223 and the second scanner 128. The image data on the front side, which has been generated by the first scanner 223, and the image data on the back side, which has been generated by the second scanner 128, are input to the image processing part 219.

The image processing part 219 subjects the image data on the front side and the image data on the back side to the shading processing of the shading correction part 212, and inputs the image data on the front side and the image data on the backside to the inclination detection part 214. The inclination detection part 214 detects an inclination amount of the leading edge of the document 102 with respect to the main scanning direction from each of the image data on the front side and the image data on the back side (Step S502). The offset update part 215 calculates a difference value between the inclination amount of the leading edge detected from the image data on the front side by the inclination detection part 214, and the inclination amount of the leading edge detected from the image data on the back side (Step S503). The image processing part 219 repeats processing in Steps S501 to S504 until document images of N documents 102 are read and N difference values of the inclination amounts are calculated (Step S504: N).

When the N difference values of the inclination amounts have been calculated (Step S504: Y), the image processing part 219 has an average value of the difference values calculated by the offset update part 215 (Step S505). As a reference value of the inclination amount of the first scanner 223 or the second scanner 128, the inclination amount of the scanner that is different from the installed or replaced scanner is used. When the first scanner 223 has been replaced, for example, the inclination amount of the second scanner 128 is used as the reference value.

The offset update part 215 checks which of the first scanner 223 and the second scanner 128 has been installed or replaced by the instruction from the control part 205 (Step S601). When the first scanner 223 has been installed or replaced (Step S601: Y), the offset update part 215 has the inclination direction of the leading edge of the document 102 checked from the average value of the difference values by the inclination determination part 1103 (Step S602).

When the leading edge of the document 102 is inclined upward to the right facing the conveying direction (Step S602: Y), the correction amount calculation part 1104 adds the average value of the difference values, which has been calculated by the average value calculation part 1102, to the second offset amount, which has been acquired from the second offset storage part 221. In this manner, the correction amount calculation part 1104 calculates the first offset amount (Step S603). When the leading edge of the document 102 is inclined downward to the right facing the conveying direction (Step S602: N), the correction amount calculation part 1104 subtracts the average value of the difference values, which has been calculated by the average value calculation part 1102, from the second offset amount, which has been acquired from the second offset storage part 221. In this manner, the correction amount calculation part 1104 calculates the first offset amount (Step S604). As described above, the second scanner 128 has not been installed or replaced, and hence the correction amount calculation part 1104 calculates the first offset amount of the first scanner 223 with reference to the second offset amount.

The correction amount calculation part 1104 determines whether or not the calculated first offset amount is within a range correctable by the inclination correction part 213 (Step S605). The image processing part 219 holds in advance a correction limit, which indicates the range correctable by the inclination correction part 213. The correction amount calculation part 1104 determines, when the calculated first offset amount is less than the correction limit, that the first offset amount is within the range correctable by the inclination correction part 213 (Step S605: Y). In this case, the correction amount calculation part 1104 stores the first offset amount in the first offset storage part 216 (Step S606). When the first offset storage part 216 has a first offset amount already stored therein, the correction amount calculation part 1104 updates the first offset amount.

The correction amount calculation part 1104 determines, when the first offset amount is equal to or more than the correction limit, that the first offset amount is not within the range correctable by the inclination correction part 213 (Step S605: N). In this case, the correction amount calculation part 1104 notifies the control part 205 that the inclination of the image data cannot be corrected. The control part 205 displays an error on the display of the operation part 218, and provides an instruction to adjust the installation of the first scanner 223 (Step S607). In addition to the display of the error, the control part 205 uses a predetermined output device to send an error notice, such as an error notice with a voice. When the first scanner 223 has been installed or replaced, the image reading apparatus 200 ends the processing as described above.

When the second scanner 128 has been installed or replaced (Step S601: N), the offset update part 215 has the inclination direction of the leading edge of the document 102 checked from the average value of the difference values by the inclination determination part 1103 (Step S701).

The first scanner 223 has not been installed or replaced, and hence the correction amount calculation part 1104 of the offset update part 215 calculates the second offset amount of the second scanner 128 with reference to the first offset amount. When the leading edge of the document 102 is inclined upward to the right facing the conveying direction (Step S701: Y), the correction amount calculation part 1104 adds the average value of the difference values, which has been calculated by the average value calculation part 1102, to the first offset amount, which has been acquired from the first offset storage part 216. In this manner, the correction amount calculation part 1104 calculates the second offset amount (Step S702). When the leading edge of the document 102 is inclined downward to the right facing the conveying direction (Step S701: N), the correction amount calculation part 1104 subtracts the average value of the difference values, which has been calculated by the average value calculation part 1102, from the first offset amount, which has been acquired from the first offset storage part 216. In this manner, the correction amount calculation part 1104 calculates the second offset amount (Step S703).

The correction amount calculation part 1104 determines whether or not the calculated second offset amount is within a range correctable by the inclination correction part 213 (Step S704). The correction amount calculation part 1104 determines, when the second offset amount is less than a correction limit, that the second offset amount is within the range correctable by the inclination correction part 213 (Step S704: Y). In this case, the correction amount calculation part 1104 stores the second offset amount in the second offset storage part 221 (Step S705). When the second offset storage part 221 has a second offset amount already stored therein, the correction amount calculation part 1104 updates the second offset amount.

The correction amount calculation part 1104 determines, when the second offset amount is equal to or more than the correction limit, that the second offset amount is not within the range correctable by the inclination correction part 213 (Step S704: N). In this case, the correction amount calculation part 1104 notifies the control part 205 that the inclination of the image data cannot be corrected. The control part 205 displays an error on the display of the operation part 218, and provides an instruction to adjust the installation of the second scanner 128 (Step S706). When the second scanner 128 has been installed or replaced, the image reading apparatus 200 ends the processing as described above.

Figure 10:
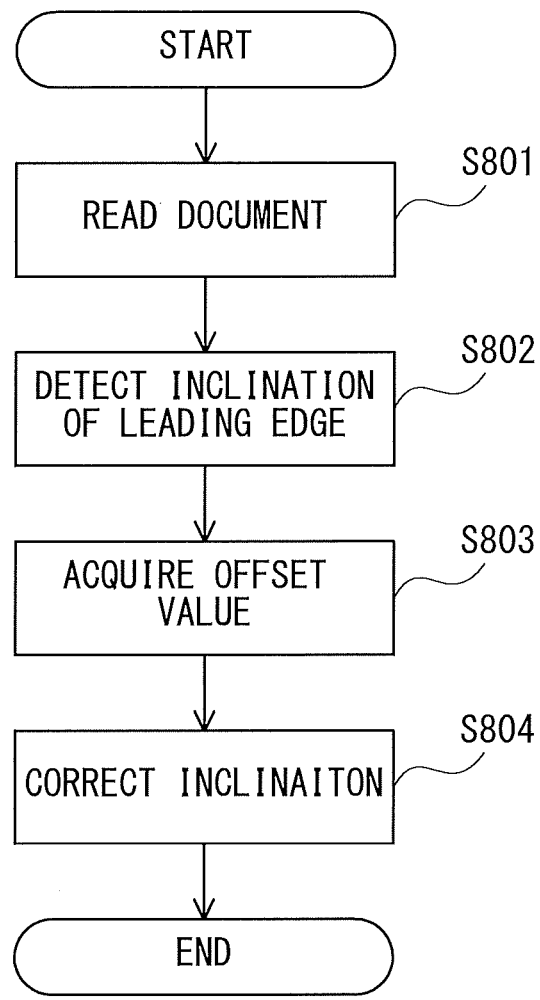
FIG. 10 is a flow chart for illustrating processing of reading a document image.

When the inclination of the image data is correctable, the image processing part 219 has the image data corrected by the inclination correction part 213 using the first offset amount and the second offset amount. FIG. 10 is a flow chart for illustrating processing of reading a document image accompanying inclination correction.

When a document 102 is placed on the document tray 101, and when an instruction to read a document image of the document 102 is given from the operation part 218, the image reading apparatus 200 reads the document image of the document 102 (Step S801). Along with the instruction to read the document image, the image reading apparatus 200 receives an instruction to read a document image on one side of the document 102 (single-sided reading) or to read document images on the both sides (double-sided reading). In the case of the single-sided reading, the image reading apparatus 200 reads the document image on the front side of the document 102 with the first scanner 223. In the case of the double-sided reading, the image reading apparatus 200 reads the document images on both sides of the document 102 with the first scanner 223 and the second scanner 128. The image data on the front side, which has been generated by the first scanner 223, and the image data on the back side, which has been generated by the second scanner 128, are input to the image processing part 219.

The image processing part 219 subjects the image data to the shading processing of the shading correction part 212, and inputs the image data to the inclination detection part 214. The inclination detection part 214 detects an inclination amount of the leading edge of the document 102 with respect to the main scanning direction from the acquired image data (Step S802). The inclination detection part 214 detects the inclination amount from the image data on the front side in the case of the single-sided reading. The inclination detection part 214 detects the inclination amount from the image data on each of the front side and the back side in the case of the double-sided reading. The detected inclination amount is input to the inclination correction part 213.

The inclination correction part 213 acquires the first offset amount from the first offset storage part 216 in the case of the single-sided reading, and acquires the first offset amount and the second offset amount from the first offset storage part 216 and the second offset storage part 221, respectively, in the case of the double-sided reading (Step S803). The inclination correction part 213 corrects inclination of the document 102 depending on the acquired offset amount and the inclination amount acquired from the inclination detection part 214 (Step S804). In the case of the single-sided reading, the inclination correction part 213 corrects inclination of the image data on the front side depending on the first offset amount and the inclination amount detected from the image data on the front side. In the case of the double-sided reading, the inclination correction part 213 corrects inclination of the image data on the front side depending on the first offset amount and the inclination amount detected from the image data on the front side, and corrects inclination of the image data on the back side depending on the second offset amount and the inclination amount detected from the image data on the back side. The inclination correction part 213 performs the correction by the following affine transformation.

$$X = x \cos \theta - y \sin \theta + x0$$

$$Y = x \sin(\theta + \theta') + y \cos(\theta + \theta') + y0$$

X: a pixel position after the correction in the main scanning direction

Y: a pixel position after the correction in the sub-scanning direction x: a pixel position before the correction in the main scanning direction y: a pixel position before the correction in the sub-scanning direction x0: a translation amount in the main scanning direction y0: a translation amount in the sub-scanning direction θ: an angle of the leading edge of the document θ': an offset amount (calculated in a unit inclination amount adjustment mode)

Figure 11:
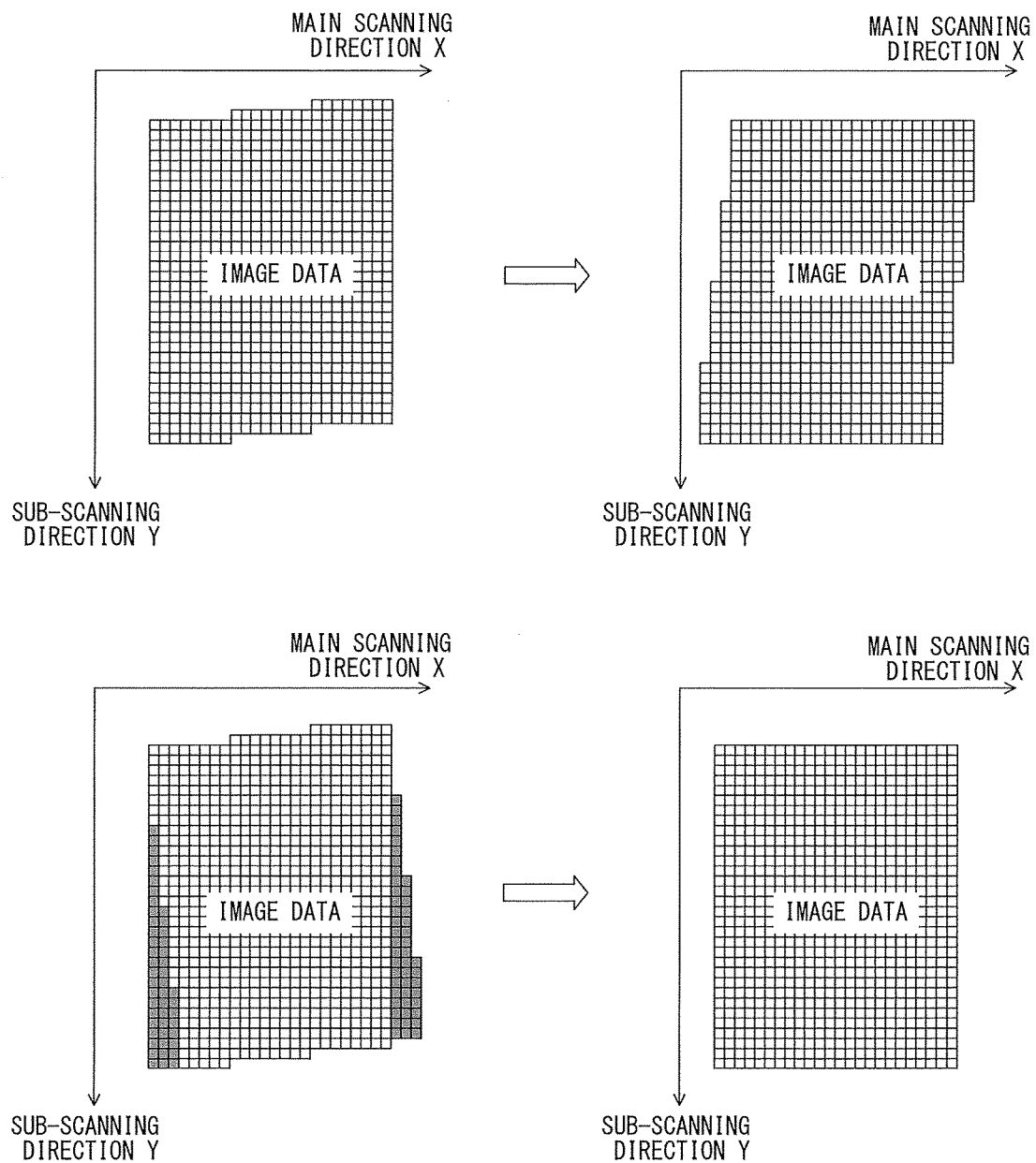
FIG. 11 is an explanatory diagram of correction of an inclination of a read image.

FIG. 11 is an explanatory diagram of correction of an inclination of a read image. The diagram on the upper left is a document image read by the first scanner 223. When the correction is performed depending on the inclination amount detected from the leading edge of the document 102 without taking into consideration the inclination of the first scanner 223, the document image is affected in the sub-scanning direction (Y) (upper right). In correcting the inclination by the affine transformation and calculating the pixel position after the correction in the sub-scanning direction, the inclination amount of the first scanner 223 is offset in a direction opposite to a direction of the correction in advance (lower left). With the offset, image data of the document image having high geometric quality may be obtained (lower right).

Figure 12:
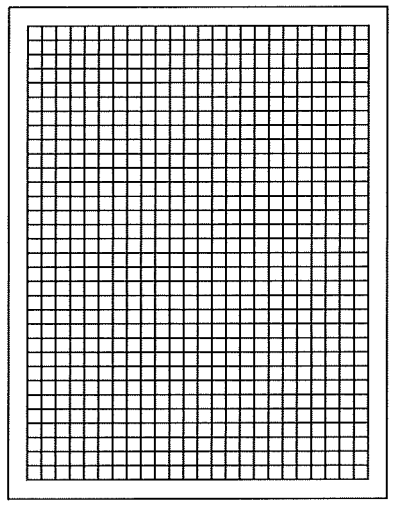
FIG. 12 is an exemplary view of a document on which an image for geometric measurement is formed.

The inclination amount of the leading edge of the document 102 is detected from the read document image by the inclination detection part 214, but may be input directly from the operation part 218. In this case, a document on which an image for geometric measurement is formed, which is illustrated in FIG. 12, is used, for example. On the document of FIG. 12, vertical and horizontal lines are formed in parallel to the sides of the document. A user uses the image reading apparatus 200 to read the document of FIG. 12, and visually checks the read document image by printing or the like to measure an inclination amount of the leading edge from an inclination of the vertical and horizontal lines. The user inputs a result of the measurement via the operation part 218. The input measurement result is sent from the operation part 218 to the control part 205. The control part 205 stores the measurement result in any one of the first offset storage part 216 and the second offset storage part 221. Which of the first offset storage part 216 and the second offset storage part 221 is to store the measurement result is instructed from the operation part 218 at the time when the measurement result is input. When the user has the image for geometric measurement read by the first scanner 223, the measurement result is stored as the first offset amount in the first offset storage part 216. When the user has the image for geometric measurement read by the second scanner 128, the measurement result is stored as the second offset amount in the second offset storage part 221.

The image reading apparatus 200 as described above may detect the inclination amount of the first scanner 223 and the second scanner 128 easily only with information on the leading edge of the document 102, and correct the inclination of the document image. Therefore, at the time of installation of the first scanner 223 and the second scanner 128, physically accurate adjustment is unnecessary, with the result that the geometric quality of the read document image may be improved while reducing an adjustment cost. Moreover, the correction condition for the scanner that has been replaced is determined with reference to the offset amount of the scanner that has not been replaced, and hence the inclination amount of the scanner can be detected more accurately than in the related art, and the high-quality document image can be read.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-158460, filed Aug. 10, 2015 which is hereby incorporated by reference herein in its entirety.

What is claimed is:

1. An image reading apparatus, comprising:
a conveying part configured to convey a document placed on a document tray;
a first scanner configured to read a first image on a first surface of the conveyed document, a scanning direction of the first scanner being a first scanning direction;
a second scanner configured to read a second image on a second surface of the conveyed document, a scanning direction of the second scanner being a second scanning direction;
a storage part configured to store a first correction condition corresponding to an inclination of the first scanning direction with respect to a direction orthogonal to a conveying direction in which the document is conveyed, and a second correction condition corresponding to an inclination of the second scanning direction with respect to the direction orthogonal to the conveying direction;
a correction part configured to correct the first image based on the first correction condition, and to correct the second image based on the second correction condition;
a detection part configured to detect a first inclination amount of the first image with respect to the direction orthogonal to the conveying direction, in which the document is conveyed, based on first image data of the first image output from the first scanner, and to detect a second inclination amount of the second image with respect to the direction orthogonal to the conveying direction, in which the document is conveyed, based on second image data of the second image output from the second scanner; and
an update part configured to update, when the first scanner has been replaced, the first correction condition based on the second correction condition, the first inclination amount, and the second inclination amount, and to update, when the second scanner has been replaced, the second correction condition based on the first correction condition, the first inclination amount, and the second inclination amount.

2. The image reading apparatus according to claim 1, wherein the detection part is configured to detect the first inclination amount from a leading edge, which is a top of the document in the conveying direction, based on the first image data, and to detect the second inclination amount from the leading edge of the document based on the second image data.

3. The image reading apparatus according to claim 1, wherein the detection part is configured to detect the first inclination amount from the first image and a first reference image obtained when the first scanning direction is not inclined with respect to the direction orthogonal to the conveying direction, and to detect the second inclination amount from the second image and a second reference image obtained when the second scanning direction is not inclined with respect to the direction orthogonal to the conveying direction.

4. The image reading apparatus according to claim 1, wherein the update part is configured to calculate a difference value between the first inclination amount and the second inclination amount, to generate, when the first scanner is replaced, a new first correction condition from the second correction condition and the difference value, and to generate, when the second scanner is replaced, a new second correction condition from the first correction condition and the difference value.

5. The image reading apparatus according to claim 4, wherein the detection part is configured to detect a plurality of the first inclination amounts from a plurality of sets of the first image data read from a plurality of documents, and to detect a plurality of the second inclination amounts from a plurality of sets of the second image data read from the plurality of documents, and
wherein the update part is configured to calculate an average value of a plurality of the difference values obtained from the plurality of the first inclination amounts and the plurality of the second inclination amounts, to generate, when the first scanner is replaced, a new first correction condition from the second correction condition and the average value, and to generate, when the second scanner is replaced, a new second correction condition from the first correction condition and the average value.

6. The image reading apparatus according to claim 4, wherein the update part is configured to make, when the generated new first correction condition is within a range correctable by the correction part, the correction part correct the first image based on the new first correction condition, and to make, when the generated new second correction condition is within a range correctable by the correction part, the correction part correct the second image based on the new second correction condition.

7. The image reading apparatus according to claim 6, wherein the update part is configured to give, when the generated new first correction condition is not within the range correctable by the correction part, an instruction to adjust installation of the first scanner via a predetermined output part, and to give, when the generated new second correction condition is not within the range correctable by the correction part, an instruction to adjust installation of the second scanner via the predetermined output part.

8. The image reading apparatus according to claim 1, wherein the correction part is configured to correct inclinations of the first image and the second image by correcting the first image by affine transformation using the first correction condition and the first inclination amount, and correcting the second image by affine transformation using the second correction condition and the second inclination amount.

9. An image reading method executed in an image reading apparatus,
wherein the image reading apparatus comprising:
a first scanner configured to read a first image on a first surface of a document conveyed through a conveying path, a scanning direction of the first scanner being a first scanning direction;
a second scanner configured to read a second image on a second surface of the document conveyed through the conveying path, a scanning direction of the second scanner being a second scanning direction; and
a storage part configured to store a first correction condition corresponding to an inclination of the first scanning direction with respect to a direction orthogonal to a conveying direction in which the document is conveyed, and a second correction condition corresponding to an inclination of the second scanning direction with respect to the direction orthogonal to the conveying direction, wherein the image reading apparatus being configured to correct the first image based on the first correction condition, and to correct the second image based on the second correction condition, comprising:

detecting a first inclination amount of the first image with respect to the direction orthogonal to the conveying direction, in which the document is conveyed, based on first image data of the first image output from the first scanner;

detecting a second inclination amount of the second image with respect to the direction orthogonal to the conveying direction, in which the document is conveyed, based on second image data of the second image output from the second scanner;

updating, when the first scanner has been replaced, the first correction condition based on the second correction condition, the first inclination amount, and the second inclination amount; and updating, when the second scanner has been replaced, the second correction condition based on the first correction condition, the first inclination amount, and the second inclination amount.

10. The image reading method according to claim 9, further comprising:

detecting the first inclination amount from a leading edge, which is a top of the document in the conveying direction, based on the first image data; and detecting the second inclination amount from the leading edge of the document based on the second image data.

11. The image reading method according to claim 9, further comprising:

detecting the first inclination amount from the first image and a first reference image obtained when the first scanner is not inclined with respect to the first scanning direction; and detecting the second inclination amount from the second image and a second reference image obtained when the second scanner is not inclined with respect to the second scanning direction.

12. The image reading method according to claim 9, further comprising:

calculating a difference value between the first inclination amount and the second inclination amount;

generating when the first scanner is replaced, a new first correction condition from the second correction condition and the difference value, thereby updating the storage part; and generating when the second scanner is replaced, a new second correction condition from the first correction condition and the difference value, thereby updating the storage part.

13. The image reading method according to claim 12, further comprising:

detecting a plurality of the first inclination amounts from a plurality of sets of the first image data read from a plurality of documents;

detecting a plurality of the second inclination amounts from a plurality of sets of the second image data read from the plurality of documents;

calculating an average value of a plurality of the difference values obtained from the plurality of the first inclination amounts and the plurality of the second inclination amounts;

generating when the first scanner is replaced, a new first correction condition from the second correction condition and the average value, thereby updating the storage part; and generating when the second scanner is replaced, a new second correction condition from the first correction condition and the average value, thereby updating the storage part.

14. The image reading method according to claim 12, further comprising:

correcting when the generated new first correction condition is within a correctable range, the first image based on the new first correction condition; and correcting when the generated new second correction condition is within a correctable range, the second image based on the new second correction condition.

15. The image reading method according to claim 14, further comprising:

giving when the generated new first correction condition is not within the correctable range, an instruction to adjust installation of the first scanner via a predetermined output part; and giving when the generated new second correction condition is not within the correctable range, an instruction to adjust installation of the second scanner via the predetermined output part.

16. The image reading method according to claim 9, further comprising correcting inclinations of the first image and the second image by correcting the first image by affine transformation using the first correction condition and the first inclination amount, and correcting the second image by affine transformation using the second correction condition and the second inclination amount.

* * * * *